United States Patent [19]

Matsuzawa et al.

[11] Patent Number: 4,844,321

[45] Date of Patent: Jul. 4, 1989

[54] METHOD FOR EXPLOSIVE CLADDING

[75] Inventors: Toshio Matsuzawa, Yamaguchi; Toru Murakado; Hiroshi Aimoto, both of Onoda; Shigetaka Kitao, Yono; Nobuo Yoshida, Himeji, all of Japan

[73] Assignee: Nippon Kayaku Kabushiki Kaisha, Tokyo, Japan

[21] Appl. No.: 80,316

[22] Filed: Jul. 31, 1987

[30] Foreign Application Priority Data

Aug. 11, 1986 [JP] Japan ................................. 61-186838
Dec. 26, 1986 [JP] Japan ................................. 61-308200

[51] Int. Cl.$^4$ ............................................. B23K 20/08
[52] U.S. Cl. ................................................... 228/107
[58] Field of Search ................. 228/107, 108, 109, 2.5; 149/2

[56] References Cited

U.S. PATENT DOCUMENTS

| | | | |
|---|---|---|---|
| 3,987,529 | 10/1976 | Nakagawa et al. | 228/109 |
| 4,010,965 | 3/1977 | Izuma et al. | 228/107 |
| 4,391,403 | 7/1983 | Persson | 228/107 |
| 4,394,198 | 7/1983 | Takeuchi et al. | 149/2 |
| 4,500,369 | 2/1985 | Tag et al. | 149/2 |
| 4,534,809 | 8/1985 | Takeuchi et al. | 149/2 |
| 4,547,232 | 10/1985 | Cartwright | 149/2 |
| 4,547,233 | 10/1985 | Delzant | 149/2 |
| 4,548,660 | 10/1985 | Ikeda et al. | 149/2 |
| 4,554,032 | 11/1985 | Hattori et al. | 149/2 |
| 4,555,278 | 11/1985 | Cescon et al. | 149/2 |

FOREIGN PATENT DOCUMENTS

| | | |
|---|---|---|
| 956485 | 10/1974 | Canada . |
| 12091 | 6/1985 | European Pat. Off. . |
| 1527243 | 8/1969 | Fed. Rep. of Germany . |
| 2850634 | 5/1979 | Fed. Rep. of Germany ...... 228/107 |
| 2948465 | 7/1980 | Fed. Rep. of Germany . |
| 1101455 | 1/1968 | United Kingdom . |
| 2185474 | 11/1985 | United Kingdom . |

*Primary Examiner*—M. Jordan
*Attorney, Agent, or Firm*—Henry C. Nields

[57] ABSTRACT

A method for explosive cladding a metal surface with one or more layers of the same or different metal with a water-in-oil type emulsion explosive and an explosive clad metal composite comprising two or more layers of the same or different metal produced by explosive cladding with a water-in-oil type emulsion explosive.

11 Claims, No Drawings

METHOD FOR EXPLOSIVE CLADDING

BACKGROUND OF THE INVENTION

This invention relates to a method for explosive cladding to be utilized for the production of clad metal composites intended for use in, for example, chemical reaction vessels and electronic sensors, and to explosive clad metal composites comprising two or more layers of the same or different metal.

Explosive cladding a layer of one metal to another layer of the same or different metal by using the force of explosion of an explosive such as dynamite or powdered high explosive has been recently well known and used all over the world.

In explosive cladding with dynamite, since the dynamite has a low-speed detonation region and a high-speed detonation region, the detonation velocity changes while the explosion-cladding is carried out and, consequently, uneven cladding takes place fairly frequently. The explosive cladding with powdered high explosive has the disadvantage that this explosive is not economical because preparation of the explosive entails time and labor. Generally the detonation velocity of a powdered high explosive depends on the thickness of the layer of the powdered explosive. Thus, from the standpoint of a performance, the explosive cladding with a powdered high explosive has the disadvantage that uniform setting of the explosive is difficult and defective cladding of metal is liable to occur, and the operation itself consequently turns out to be very expensive.

The present inventors continued a study in search of a method which effects an explosive cladding without causing such defects as uneven cladding and which is economic from the operational point of view. As a result, they have found that a method of explosive cladding, in which a water-in-oil type (hereinafter referred to as "w/o" type) emulsion explosive is used, is capable of effecting the explosive cladding without causing any defective cladding and economical as compared with the conventional methods. More precisely, the present inventors have found that the w/o type emulsion explosive exhibits an exceptionally stable detonation velocity and further that the detonation velocity of the w/o type emulsion explosive can be easily regulated in a range from 5,000 m/sec to 2,000 m/sec by suitably selecting the amount of minute hollow spheres contained in the w/o type emulsion explosive thereby varying the specific gravity thereof. The present invention has been on the basis of these findings. Table 1 shows typical experimental details on the specific gravity and the detonation velocity of the w/o type emulsion explosives measured by the present inventors.

TABLE 1

| No. | Specific gravity | Detonation velocity (m/sec) |
| --- | --- | --- |
| 1 | 1.25 | 4,460 |
| 2 | 1.20 | 5,020 |
| 3 | 1.10 | 4,900 |
| 4 | 1.00 | 4,520 |
| 5 | 0.90 | 4,080 |
| 6 | 0.80 | 3,680 |
| 7 | 0.70 | 3,220 |
| 8 | 0.60 | 2,800 |
| 9 | 0.50 | 2,320 |
| 10 | 0.40 | 2,050 |

Composition of explosive:
Emulsion—71% of ammonium nitrate, 10% of sodium nitrate, 13% of water, 4% of carbonaceous fuel, and 2% of emulsifier (by weight)
Minute hollow spheres—Glass bubbles, produced by 3M Corp. and marketed under trademark of "C15" (The amount of the glass bubbles added to the emulsion was varied according to specific gravity desired.)
Detonation velocity: This property was determined by the ion gap method in a paper cartridge of 30 mm in diameter.

It has been found by the present inventors that, as noted in Table 1, the detonation velocity of the w/o type emulsion explosive can be easily controlled by specific gravity thereof and that the w/o type emulsion explosive, therefore, is proved to be suitable for a method of explosive cladding which requires, a variable detonation velocity according to the kinds of metals to be clad.

TABLE 2

| Thickness (mm) | Detonation velocity (m/sec) |
| --- | --- |
| 15 | 4,550 |
| 20 | 4,530 |
| 30 | 4,540 |
| 40 | 4,610 |

The results given in this table were obtained by using the w/o type emulsion explosive identified as No. 4 in Table 1.

The w/o type emulsion explosive was formed into a layer having a fixed width of 50 mm and a varying thickness and the detonation velocity was measured by the ion gap method.

The inventors have further found that, as clearly noted in Table 2, the detonation velocity of the w/o type emulsion explosive is hardly variable with the thickness of the layer (cartridge diameter) thereof. The characteristic that the detonation velocity is not eesely varied by the thickness results in the advantage that no defective cladding is caused even in the presence of a moderate unevenness in the thickness of the layer of the explosive and as a result the time and labor to be spent in setting the explosive is greatly saved. This characteristic further leads to the fact that a change in thickness of the layer of cladding metal (flyer) can be coped with by merely changing the thickness of the layer of the w/o type emulsion explosive. The method of explosive cladding according to the present invention is, therefore, far excellent compared with the conventional method of explosive cladding in terms of ease of the work and ease of the design of explosive cladding.

It has been further found by the present inventors that, as shown in Table 3, the start-up of the detonation velocity of the w/o type emulsion explosive rises quickly.

TABLE 3

| | | Explosive | | | |
| --- | --- | --- | --- | --- | --- |
| | | $2^{*1}$ | $5^{*1}$ | $8^{*1}$ | Dynamite "Shinkiri" |
| Detonation velocity (m/sec) | $1^{*2}$ cm | 5010 | 3950 | 3000 | 980 |
| | $2^{*2}$ cm | 4950 | 4130 | 2860 | 1300 |
| | $3^{*2}$ cm | 5030 | 4050 | 2820 | 1410 |
| | $4^{*2}$ cm | 5130 | 4010 | 2950 | 4320 |
| | $5^{*2}$ cm | 4920 | 4120 | 3010 | 4180 |

TABLE 3-continued

| | Explosive | | | |
|---|---|---|---|---|
| | 2*1 | 5*1 | 8*1 | Dynamite "Shinkiri" |
| 6*2 cm | 5010 | 4070 | 2880 | 4520 |

The measurement of the detonation velocity was carried out in a paper cartridge of 30 mm in diameter.

The number marked by "*1" denotes the w/o type emulsion explosive identified by the same number in Table 1.

The length marked by "*2" denotes the distance from the bottom of the detonator. The detonation velocity at 1 cm represents the average detonation velocity measured over a distance of 1 cm from the bottom of the detonator to the point of 1 cm, the detonation velocity at 2 cm represents the average detonation velocity measured over a distance of 1 cm from the point of 1 cm to that of 2 cm, and so on.

This quick rise of the detonation velocity make a leading portion unnecessary in the actual operation of the explosive cladding. It also results in an effect of decreasing the amount of the explosive to be used. Though this effect is not conspicuous where the metals to be clad are large, it is relatively conspicuous where the metals to be clad are small. For example, when a flyer metal of 10 cm in length is to be clad with parent plate, the w/o type emulsion explosive has absolutely no need for any leading portion but the dynamite "Shinkiri" requires use of a leading portion of 4 cm in length. This fact clearly shows that the dynamite must be used in an appreciably larger amount than the w/o type emulsion explosive. When plural explosive claddings of such a small size are to be simultaneously carried out, the effect of abating noise and vibration with less the amount of the w/o type emulsion explosive in use is quite conspicuous.

Further, it has been found by the present inventors that the w/o type emulsion explosive does not cause a pain such as headache to a person handling it due to inhalation thereof because it contains no nitro compound such as nitroglycerin and nitroglycol. It has been further found that, when this w/o type emulsion explosive is put to use in the explosive cladding, it can be easily molded, as it is similarly to the dynamite, even in such special shapes which cannot be obtained if the powdered explosive is used and, as a result, the w/o type emulsion explosive enjoys notably improved workability. This effect in the improved workability is effective, expecially in small size explosive cladding.

It has been also found by the present inventors that the w/o type emulsion explosive has an oil phase as the external phase and, therefore, is superior to the powdered explosive in waterproofness and moistureproofness, that is, even when the w/o type emulsion explosive is left standing long in a state open to air, it has no possibility of absorbing moisture and suffering from degradation of quality unlike the powdered explosive and found that the w/o type emulsion explosive can be used with no problem when the explosive cladding is carried out under highly humid conditions such as the outdoors in the rain.

The present inventors have further found that when the w/o type emulsion explosive used in the explosive cladding has a specific gravity preferably below 0.9, more preferably below 0.8, most preferably in the range of 0.4 to 0.7 and a detonation velocity of not more than 80% of the sonic velocity (Vm) in the metal to be clad (calculated by the following formula), the effect of the explosive cladding is uniform and highly desirable.

$$Vm = \sqrt{\left(K + \frac{4}{3}G\right)/\rho}$$

wherein Vm stands for the sonic velocity in the metal, K for the bulk modulus, G for the share modulus, and $\rho$ for the density.

Heretofore, the explosive cladding of such special metals as copper and titanium by the use of dynamite or powdered explosive has necessitated adoption of an extremely time-consuming and expensive method in which the specific gravity of the explosive and the thickness of the layer thereof must be controlled to a given value with high accuracy for the purpose of ensuring uniformity of the cladding. By the method of the present invention, such special metals as mentioned above can be easily clad with high uniformity owing to the use of the w/o type emulsion explosive which has a specific gravity preferably below 0.9, more preferably below 0.8, most preferably in the range of 0.4 to 0.7 and a detonation velocity of not more than 80% of the sonic velocity in the metal.

It has been also found by the inventors that, when the w/o type emulsion explosive having a specific gravity in the range of 0.4 to 0.7 and a detonation velocity of not more than 80% of the sonic velocity in the metal is used in the explosive cladding, flyer metals having a very small thickness of not more than 2 mm or of an extremely thin thickness of not more than 0.7 mm can be easily and uniformly clad by using the explosive in a very small amount.

The detonation velocity of the w/o type emulsion explosive is preferred, as described above, to be not more than 80% of the sonic velocity in the metal. However, when the metal is one such as copper, brass, iron, aluminum, titanium, stainless steel, nickel, Hastelloy, etc., the w/o type emulsion explosive to be used in the explosive cladding is preferred to possess a detonation velocity in the range of 2,000 to 3500 m/sec for the purpose of ensuring high uniformity of the cladding.

In contrast to the conventional powdered explosive or dynamite which is so flammable and so sensitive to shocks as to render the handling thereof dangerous, the w/o type emulsion explosive used in the present invention has the advantage that the w/o type emulsion explosive is very safe to handle because it is not highly flammable and is insensitive to shocks.

The explosive clad metal composite which is obtained by the method of explosive cladding according to the present invention shows a higher shear strength than the clad metal composite obtained by the conventional method of explosive cladding as shown in Example 3 presented subsequently.

SUMMARY OF THE INVENTION

In a first aspect of the present invention, there is provided a method for explosive cladding a metal layer with one or more layers of the same or different metals by using a water-in-oil type emulsion explosive.

In a second aspect of the present invention, there is provided a clad metal composite comprising at least two layers of the same or different metal produced by explosive cladding a metal layer with one or more layers of the same or different metals by using water-in-oil type emulsion explosive.

DETAILED DESCRIPTION OF THE INVENTION

The w/o type emulsion explosive used in the method of explosive cladding according to the present invention is an explosive which is obtained by preparing an emulsion having an aqueous solution of oxidizing agent as a discontinuous phase and an emulsified carbonaceous fuel as a continuous phase and adjusting the sensitivity of the emulsion by incorporation therein of minute hollow spheres. This w/o type emulsion explosive may optionally contains therein powdery explosive substance, a solid oxidizing agent, or a solid fuel.

The aqueous solution of oxidizing agent used in the w/o type emulsion explosive according to the present invention is an aqueous solution of one or a mixture of two or more of ammonium nitrate, nitrates of alkali metals, nitrates of alkaline earth metals, chlorates of alkali metals, chlorates of alkaline earth metals, perchlorates of alkali metals, perchlorates of alkaline earth metals, and ammonium perchlorate. Optionally, the aqueous solution of oxidizing agent may contain a water-soluble sensitizer such as monomethyl amine nitrate or hydrazine nitrate. The water content of the aqueous solution of oxidizing agent is preferably in the range of 7 to 30% by weight. As an auxiliary solvent for the aqueous solution of oxidizing agent, there can be used a water-soluble organic solvent such as methyl alcohol, ethylene glycol, etc.

The amount of the aqueous solution of oxidizing agent is preferably in the range of 30 to 98% by weight based on the total amount of the w/o type emulsion explosive.

The carbonaceous fuel used in the preparation of the w/o type emulsion explosive according to the present invention is one or a mixture of two or more of petrolic oils such as fuel oil and mineral oil, petrolic waxes such as paraffin wax and microcrystalline wax, and animal and vegetable oils such as hydrophobic vegetable oils, hydrophobic animal fats, and hydrophobic vegetable waxes, and resins such as α-olefin polymers and polybutene.

The amount of the carbonaceous fuel is preferably in the range of 0 to 10% by weight, based on the total amount of the w/o type emulsion explosive according to the present invention.

The emulsifier used in the w/o type emulsion explosive of the present invention is any of the conventional emulsifiers used for the preparation of w/o type emulsions. Such an emulsifier includes alkali metal salts of stearic acid, ammonium stearate, calcium stearate, polyoxyethylene ethers, esters of sorbitan fatty acids and esters of sorbitol fatty acids, and used singly or as a mixture of two or more of them. The amount of the emulsifier to be used herein is preferably in the range of 0.5 to 7% by weight, based on the total amount of the w/o type emulsion explosive. Optionally, in the w/o type emulsion explosive of the present invention, the continuous phase may be formed solely of emulsifier(s), i.e. without using any carbonaceous fuel.

The w/o type emulsion explosive of the present invention, when necessary, may contain a solid explosive substance such as TNT or penthrite, a solid oxidizing agent such as prilled ammonium nitrate or powdered sodium nitrate, a metallic powder such as aluminum powder or magnesium powder, or an organic powder such as wood powder or starch.

The minute hollow spheres used in the w/o type emulsion explosive of the present invention are particulate materials which comprises closed cell, hollow cavities. Each particle of the material can contain one or more closed cells, and the cells can contain a gas, such as air, or can be evacuated or partially evacuated.

The examples of the material include glass, pearlite, silastic, saran and bakelite. The preferred minute hollow spheres are discrete glass spheres having a particle size within the range of about 10 to about 175 microns. In general, the bulk density of such particles can be within the range of about 0.1 to about 0.4 g/cc. Some preferred glass microbubbles are the microbubbles sold by 3M Company and which have a particle size distribution in the range of from about 10 to about 160 microns and a nominal size in the range of about 60 to 70 microns, and densities in the range of from about 0.1 to about 0.4 g/cc. The most preferred of such microbubbles sold by 3M Company are distributed under the trademark C 15/250.

The amount of the minute hollow spheres to be incorporated in the w/o type emulsion is determined by the specific gravity of the minute hollow spheres to be added and the specific gravity of the w/o type emulsion explosive to be obtained. Since the minute hollow organic spheres have a very small specific gravity, the minute hollow spheres are generally used in an amount falling in a very wide range of from 0.1% by weight to 50% by weight based on the total amount of the w/o type emulsion explosive.

When preparing the w/o type emulsion explosive having a specific gravity of less than 0.9, the amount of the minute hollow spheres to be added is preferably in the range of 1.5 to 50% by weight based on the total amount of the w/o type emulsion explosive.

When preparing the w/o type emulsion explosive having a specific gravity in the range of 0.4 to 0.7, the amount of the minute hollow spheres is preferably in the range of 3 to 50% by weight, more preferably in the range of 13 to 40% by weight based on the total amount of the w/o type emulsion explosive.

The thickness of the flyer metal is generally 2 mm to 25 mm and the thickness of the parent plate is generally 5 mm to 50 mm.

When the w/o type emulsion explosive which has a specific gravity of in the range of 0.4 to 0.7 adjusted by using 13 to 40% by weight based on the total amount of the w/o type emulsion explosive of minute hollow glass spheres having a specific gravity in the range of 0.12 to 0.26 is used as an explosive for the explosive cladding by the method of this invention, a flyer of a very small thickness of not more than 2 mm or of an extremely thin thickness of not more than 0.7 mm can be clad with high efficiency.

Examples of the metals to which the method of explosive cladding according to the present invention is effectively applied include aluminum, steel, iron, titanium, niobium, chromium, cobalt, Monel (an alloy of nickel, copper, iron and manganese), nickel, Hastelloy, Inconel (an alloy of 80% of nickel, 14% of chromium and 6% of iron), stainless steel, beryllium, magnesium, molybdenum, tungsten, tantalum, zirconium, silver, platinum, copper, brass, white copper, gold and alloys of such metals. Each layer of metals to be clad may be of one metal or of alloy of two or more different metals.

Optionally either of the two layers to be clad may be a composite of two or more layers.

The explosive cladding according to the present invention can be carried out by any of the conventional methods generally practised for the purpose except for using the w/o type emulsion explosive. Generally, the explosive cladding is carried out by applying a thin sheet of the w/o type emulsion explosive on a flyer metal to be clad, optionally providing parallel standoffs under the flyer metal, setting parent metal plate of the same kind or different kind under the parallel standoffs, and then initiating a detonator disposed at one end of the layer of the w/o type emulsion explosive thereby cladding the first metal layer with the second metal layer.

The present invention will be described more in detail referring the following non-limitative examples.

EXAMPLE 1

On a stainless steel plate of 100 mm in width, 300 mm in length, and 5 mm in thickness, a sheet of the w/o type emulsion explosive set forth below, which is 100 mm in width and 300 mm in length and 32 mm in thickness, was applied. Parallel standoffs of 5 mm were provided under the stainless steel plate and a mild steel plate of 100 mm in width, 250 mm in length, ad 30 mm in thickness was set thereunder. By initiating with a No. 6 detonator attached to one end of the layer of the w/o type emulsion explosive, the stainless steel plate (sonic velocity 5,790 m/sec) was clad to the mild steel plate.

The state of interfacial waves between the two metal plates was uniform.

[Composition of w/o type emulsion explosive and process for preparation thereof]

A w/o type emulsion was obtained by dissolving and mixing 0.5 part by weight of liquid paraffin, 2.0 parts by weight of microcrystalline wax (produced by Esso Oil Company and marketed under trademark of "Eslax 172"), and 1.0 part by weight of paraffin wax (produced by Nippon Oil Company and marketed under trademark of "145° Paraffin") at about 90° C. and subsequently adding to the resultant mixture under stirring an aqueous solution of oxidizing agent produced in advance by dissolving 67.5 parts by weight of ammonium nitrate and 5 parts by weight of sodium nitrate into 10.0 parts by weight of water at about 90° C. and 3.0 parts by weight of sorbitan oleate as an emulsifier. Then, 6.8 parts by weight of hollow glass spheres (produced by 3M Corp., and marketed under trademark of "C12/250") was added into the w/o type emulsion prepared above, thereby obtaining a w/o type emulsion explosive having the specific gravity of 0.89. In a paper cartridge of 30 mm in diameter, this explosive showed a detonation velocity of 4,050 m/sec.

COMPARATIVE EXAMPLE 1

Explosive cladding was carried out by following the procedure of Example 1, except for using shinkiri dynamite as an explosive.

The Shinkiri dynamite showed a detonation velocity of 5,680 m/sec in a paper cartridge of 30 mm in diameter.

The state of cladding between the two plates showed uneven claddings at a distance of 50 mm from the point of initiation and the part which was not clad effectively was found.

EXAMPLE 2

On a copper plate of 200 mm in width, 350 mm in length, and 3 mm in thickness, a sheet of the w/o type emulsion explosive set forth below, which is 200 mm in width, 350 mm in length and 20 mm in thickness, was applied. Parallel standoffs of 2 mm were provided under the copper plate and a stainless steel plate of 200 mm in width, 300 mm in length, and 30 mm in thickness was set thereunder. By initiating with a No. 6 detonator attached to one end of the layer of the w/o emulsion explosive, the copper plate (sonic velocity 5,010 m/sec) was clad to the stainless steel plate.

The state of interfacial waves between the two plates was uniform.

[Composition of w/o type emulsion explosive and process for preparation thereof]

The same w/o type emulsion as described in Example 1 was prepared by following the procedure of Example 1. A w/o type emulsion explosive having the specific gravity of 0.87 was produced by mixing the w/o type emulsion with 7.0 parts by weight of minute hollow glass spheres (produced by 3M Corp. and marketed under trademark of "C15/250").

In a paper cartridge of 30 mm in diameter, this explosive showed the detonation velocity of 3,990 m/sec.

COMPARATIVE EXPERIMENT 2-1

A powdered explosive, RDX, was placed with uniformly and tightly in a cardboard box of 200 mm in width, 350 mm in length, and 10 mm in thickness. Explosive cladding was carried out by following the procedure of Example 2 except for using the explosive packed in the cardboard box.

In a paper cartridge of 30 mm in diameter, the explosive RDX showed the detonation velocity of 4,950 m/sec.

Uneven cladding was found over the whole clad metal composite and the defective parts in which the metal layers were not clad effectively were also found.

COMPARATIVE EXPERIMENT 2-2

Explosive cladding was carried out by following the procedure of Example 2 except for using Shinkiri dynamite as an explosive. In a paper cartridge of 20 mm in diameter, this dynamite showed the detonation velocity of 3,750 m/sec.

In this Comparative Experiment 2—2, the defective parts in which the metal layers were not clad effectively were observed despite the low detonation velocity of the dynamite used therein. The poor results may be explained by a supposition that the low detonation velocity region of the dynamite was not stable in velocity and converted into the high detonation velocity region occasionally.

EXAMPLE 3

Outside a titanium tube (sonic velocity 5,990 m/sec) of 25 mm in inside diameter, 350 mm in length, and 5 mm in thickness, a sheet of the same w/o type emulsion explosive as used in Example 2 of 10 mm in thickness and 350 mm in length was circumferentially applied. Along the axis of this tube, a copper cylinder of 20 mm in diameter and 400 mm in length was positioned concentrically in the tube. By initiating with a No. 6 detonator attached to one end of the layer of the w/o type emulsion explosive, the titanium tube (sonic velocity 5,990 m/sec) was clad to the copper cylinder.

The interfacial waves between the tube and the cylinder obtained was uniform.

The shear strength of the clad composite was 2.2 kg/mm$^2$, and surpasses the shear strength, 17.5 kg/mm$^2$, exhibited by the titanium-copper clad composite obtained by the conventional explosive cladding using powdered explosive.

COMPARATIVE EXPERIMENT 3

Explosive cladding was carried out by following the procedure of Example 3 except for using Shinkiri dynamite in the place of the w/o type emulsion explosive.

This dynamite showed a detonation velocity of 3,240 m/sec in a paper cartridge of 15 mm in diameter.

The defective parts in which cladding was not partly effected were observed.

EXAMPLE 4

On a stainless steel sheet of 50 mm in width, 200 mm in length and 0.2 mm in thickness a sheet of a w/o type emulsion explosive set forth below, of 50 mm in width, 200 mm in length and 10 mm in thickness was applied. Parallel standoffs of 1 mm were provided under the stainless steel sheet and a naval bronze plate of 50 mm in width, 200 mm in length and 3 mm in thickness was set thereunder.

By initiating with a No. 6 detonator attached to one end of the layer of the w/o type emulsion explosive, the stainless steel plate (sonic velocity 5,790 m/sec) was clad to the naval brass plate (sonic velocity 4,700 m/sec.)

The interfacial waves formed by the explosion was uniform. [Composition of w/o type emulsion explosive and process for preparation thereof]

A w/o type emulsion was obtained by mixing 0.3 part by weight of liquid paraffin and 2.4 parts by weight of microcrystalline wax (produced by Esso Oil Company and marketed under trademark designation of "Eslax 172") at about 90° C. and adding to the resultant mixture under stirring an aqueous solution of oxidizing agent prepared in advance by mixing 61.8 parts by weight of ammonium nitrate, 9.0 parts by weight of sodium nitrate, and 10.6 parts by weight of water at about 90° C. and 2.9 parts by weight of sorbitan oleate added as an emulsifier. A w/o type emulsion explosive having the specific gravity of 0.66 was produced by mixing this w/o type emulsion with 13 parts by weight of minute hollow glass spheres having the specific gravity of 0.15 (produced by 3M Corp. and marketed under trademark of "C15/250"). In a paper cartridge of 30 mm in diameter, this explosive showed the detonation velocity of 2,980 m/sec.

COMPARATIVE EXPERIMENT 4

Explosive cladding was carried out by following the procedure of Example 4, except for using Shinkiri dynamite as an explosive. Although explosion of the dynamite was observed to occur near the detonator, the detonation discontinued halfway along the entire length of the layer of explosive. As the result, the stainless steel sheet was clad only in a limited portion thereof.

EXAMPLE 5

On a stainless steel sheet of 100 mm in width, 300 mm in length and 0.5 mm in thickness, a sheet of a w/o type emulsion explosive, set forth below, of 100 mm in width, 300 mm in length and 10 mm in thickness was applied. Parallel standoffs of 2 mm were provided under the stainless steel sheet and an aluminum plate of 100 mm in width, 300 mm in length and 5 mm in thickness was set thereunder. By initiating with a No. 6 detonator attached to one end of the layer of the w/o type emulsion explosive, the stainless steel sheet and the aluminum plate (sonic velocity 6,420 m/sec) were clad.

The interfacial waves formed by the explosion was uniform.

[Composition of w/o type emulsion explosive and process for preparation thereof]

The same w/o type emulsion as described in Example 4 was prepared by following the procedure of Example 4. Then, a w/o type emulsion explosive having the specific gravity of 0.52 was produced by mixing the w/o emulsion with 20% by weight of minute hollow glass spheres having a specific gravity of 0.15 (produced by 3M Corp. and marketed under trademark of "C15/250"). This explosive showed a detonation velocity of 2,450 m/sec in a paper cartridge of 30 mm in diameter.

COMPARATIVE EXPERIMENT 5

Explosion-cladding was carried out by following the procedure of Example 5 except for using a powdered ammonium nitrate explosive (Shobaku No. 5) as an explosive. Although explosion of the powdered ammonium nitrate explosive was observed to occur near the detonator, the detonation discontinued halfway along the entire length of the layer of explosive. As the result, the stainless steel sheet was clad only in a limited portion thereof.

What is claimed is:

1. A method for explosive cladding a metal layer with one or more layers of the same or different metals comprising the following steps: (1) applying a sheet of a water-in-oil type emulsion explosive on a flyer metal layer to be clad, (2) setting a parent metal layer, and then (3) initiating a detonator disposed at the layer of said water-in-oil type emulsion explosive, whereby said flyer metal layer is clad with said parent metal layer.

2. The method according to claim 1, wherein said water-in-oil type emulsion explosive has a specific gravity of less than 0.9.

3. The method according to claim 1, wherein said water-in-oil type emulsion explosive has a specific gravity of less than 0.8.

4. The method according to claim 1, wherein said water-in-oil type emulsion explosive has a specific gravity in the range of 0.4 to 0.7.

5. The method according to claim 1, wherein said water-in-oil type emulsion explosive contains 3 to 50% by weight of minute hollow spheres.

6. The method according to claim 1, wherein said water-in-oil type emulsion explosive contains 13 to 40% by weight of minute hollow spheres.

7. The method according to claim 1, wherein the specific gravity of said water-in-oil type emulsion explosive is adjusted in the range of 0.4 to 0.7 by using minute hollow spheres having a specific gravity in the range of 0.12 to 0.26 in an amount of 13 to 40% by weight of said water-in-oil type emulsion explosive.

8. The method according to claim 1, wherein said water-in-oil type emulsion explosive has a detonation velocity of not more than 80% of the sonic velocity in metal to be clad.

9. The method according to claim 1, wherein said water-in-oil type emulsion explosive has a detonation velocity in the range of 2,000 to 3,500 m/sec.

10. The method according to claim 1, wherein the cladding layer of the metal have a thickness of not more than 2 mm.

11. The method according to claim 1, wherein the cladding layer of the metal have a thickness of not more than 0.7 mm.

* * * * *